United States Patent
Dunn et al.

(10) Patent No.: US 9,286,081 B2
(45) Date of Patent: Mar. 15, 2016

(54) INPUT DEVICE EVENT PROCESSING

(71) Applicant: Apple Inc., Cupertino, CA (US)

(72) Inventors: Corbin R. Dunn, Los Gatos, CA (US);
Ali T. Ozer, Redwood City, CA (US);
Raleigh Joseph Ledet, Sunnyvale, CA (US); Kristin Forster, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 13/648,688

(22) Filed: Oct. 10, 2012

(65) Prior Publication Data

US 2013/0332867 A1 Dec. 12, 2013

Related U.S. Application Data (60) Provisional application No. 61/658,884, filed on Jun. 12, 2012.

(51) Int. Cl.
*G06F 9/44* (2006.01)
*G06F 3/038* (2013.01)
*G06F 9/54* (2006.01)

(52) U.S. Cl.
CPC .............. *G06F 9/4443* (2013.01); *G06F 3/038* (2013.01); *G06F 9/542* (2013.01); *G06F 2209/545* (2013.01)

(58) Field of Classification Search
None
See application file for complete search history.

(56) References Cited

U.S. PATENT DOCUMENTS 7,181,601 B2 * 2/2007 Rudd et al. ............... 712/239
7,577,826 B2 * 8/2009 Suba ......................... 712/220
2005/0125802 A1 * 6/2005 Wang et al. .............. 718/108
2011/0271151 A1 * 11/2011 Stevens ..................... 714/50
2012/0174121 A1 * 7/2012 Treat et al. ................ 719/318
2013/0318221 A1 * 11/2013 Anaya et al. .............. 709/223

OTHER PUBLICATIONS

Apple, "Multithreading Programming Topics" (Oct. 31, 2007), pp. 1-80 [retrieved from http://www.filibeto.org/unix/macos/lib/dev/documentation/Cocoa/Conceptual/Multithreading/Multithreading.pdf].*
Collins, C.; Galpin, M.; Kappler, M., "Android in Practice" (Oct. 10, 2011), Manning Publications Co., pp. 1-647.*
Savitch, W., "Absolute Java" (Apr. 18, 2005), Pearson Education, Inc., pp. 854-859.*
iPadForums.net, "Ipad web browsers: checkerboarding or jerky scrolling" (May 27, 2011), pp. 1-10 [retrieved from http://www.ipadforums.net/threads/ipad-web-browsers-checkerboarding-or-jerky-scrolling.27617/].*

(Continued)

*Primary Examiner* — Brian W Wathen
(74) *Attorney, Agent, or Firm* — Fish & Richardson P.C.

(57) ABSTRACT

A background thread can be used to process events, e.g., a touch, gesture, pinch, or swipe, that are received on a touch sensitive device, or events, e.g., mouse scroll wheel events that are received on a input device, e.g., a mouse. The background thread can be used to process events when a main thread assigned to the Graphical User Interface (GUI) is interrupted. In such situations, the background thread can continue processing events. In cases where the main thread is interrupted and the event is scroll input, the background thread can draw content on the GUI in response to the scroll, so that the response to the scroll input observed by the user is unaffected by the interrupted main thread. By processing events and drawing content using the background thread while the main thread is blocked, the GUI can be navigated without having the user experience a stall or stutter.

25 Claims, 6 Drawing Sheets

(56) References Cited

OTHER PUBLICATIONS

Tanenbaum, A., "Modern Operating Systems" (2001), $2^{nd}$ Edition, Prentice-Hall, Inc., pp. 71-100.*

Wilson, B., "I/O in Google Chrome" (Oct. 8, 2008), pp. 1-5 [retrieved from http://blog.chromium.org/2008/10/io-in-google-chrome.html].*

* cited by examiner

INPUT DEVICE EVENT PROCESSING

CROSS-REFERENCE TO RELATED APPLICATION

This application claims priority from U.S. Provisional Application No. 61/658,884, filed Jun. 12, 2012, and titled "Input Device Event Processing," which is incorporated by reference.

TECHNICAL FIELD

This subject matter is generally related to processing events for navigating content in graphical user interface (GUI).

BACKGROUND

Graphical user interfaces (GUIs) are often used to display content, e.g., graphical representations of electronic documents, images, and text. Users can navigate between pages of the displayed content by interacting with a touch sensitive surface using one or more fingers and/or making gestures, or by a mouse or mouse scroll wheel.

SUMMARY

This disclosure describes systems, methods, and computer program products for scrolling content that is displayed on a GUI.

In multithreaded computing environments, a device running an operating system can execute one or more processes for performing various jobs, e.g., executing a computer program. Each process can spawn one or more threads that can be used to execute various sub-tasks. Generally, a thread of execution is the smallest unit of processing that can be scheduled by an operating system. In some implementations, a first or "main" thread is assigned to process tasks relating to a GUI. For example, the main thread can be used to draw content on the GUI and to process user feedback, e.g., process input device events that are received on a touch sensitive surface or generated by a mouse, e.g., mouse scroll wheel.

In some implementations, one or more other threads (hereinafter also referred to as "background" threads) can be used to process input device events, e.g., a touch, gesture, pinch, swipe, or finger move, as received on a touch sensitive surface, or a mouse scroll wheel move, as received on a mouse. A background thread runs separately from the main thread and is able to process its own tasks concurrently with the tasks being processed by the main thread. The one or more background threads can be used to process input device events in situations when a main thread assigned to the GUI is interrupted, e.g., stalled. In such situations, the one or more background threads can continue processing input device events when the main thread is not responding. In cases where the main thread is interrupted and the input device event is a scroll input, i.e., input that moves graphical content displayed on a user interface, the one or more background threads can draw content on the GUI in response to the scroll input, so that the processing of the scroll input observed by the user is unaffected by the main thread being interrupted. In some implementations, the one or more background threads draw content that was cached during processing of input device events by the main thread before it became interrupted. In some implementations, when cached content is unavailable, the drawn content can be a placeholder graphic, e.g., a checkerboard graphic. By processing input device events and drawing content using the one or more background threads while the main thread is blocked, the GUI can be navigated without having the user experience a stall or stutter.

In some implementations, a method includes: receiving one or more input device events for navigating content presented on a graphical user interface; storing the one or more input device events in an event queue, the event queue including one or more events relating to the graphical user interface; processing events stored in the event queue using a first processing thread; determining an interrupt in the processing of the events by the first processing thread; and in response to the determination, spawning a second processing thread, wherein the second processing thread processes the one or more input device events from the event queue, wherein the method is performed by one or more hardware processors.

In some implementations, a method includes: receiving one or more input device events for navigating content presented on a graphical user interface; storing the one or more input device events in an event queue, the event queue including one or more events relating to the graphical user interface; processing the one or more events from the event queue using a first processing thread; and processing the one or more input device events from the event queue using a second processing thread; wherein the method is performed by one or more hardware processors.

In some implementations, a method includes: receiving one or more input device events for navigating content presented on a graphical user interface; storing the one or more input device events in an event queue, the event queue including one or more events relating to the graphical user interface; processing the one or more events from the event queue using a first processing thread; predicting an interrupt in the processing of the one or more events by the first processing thread; and in response to the prediction, instructing a second processing thread to process the one or more events from the event queue, wherein the method is performed by one or more hardware processors.

Other implementations are disclosed which are directed to systems, methods and computer-readable mediums.

DESCRIPTION OF DRAWINGS

The same reference symbol used in various drawings indicates like elements.

DETAILED DESCRIPTION

Example Device Architecture for Processing Events

Hereafter, when the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from a user.

Figure 1A:
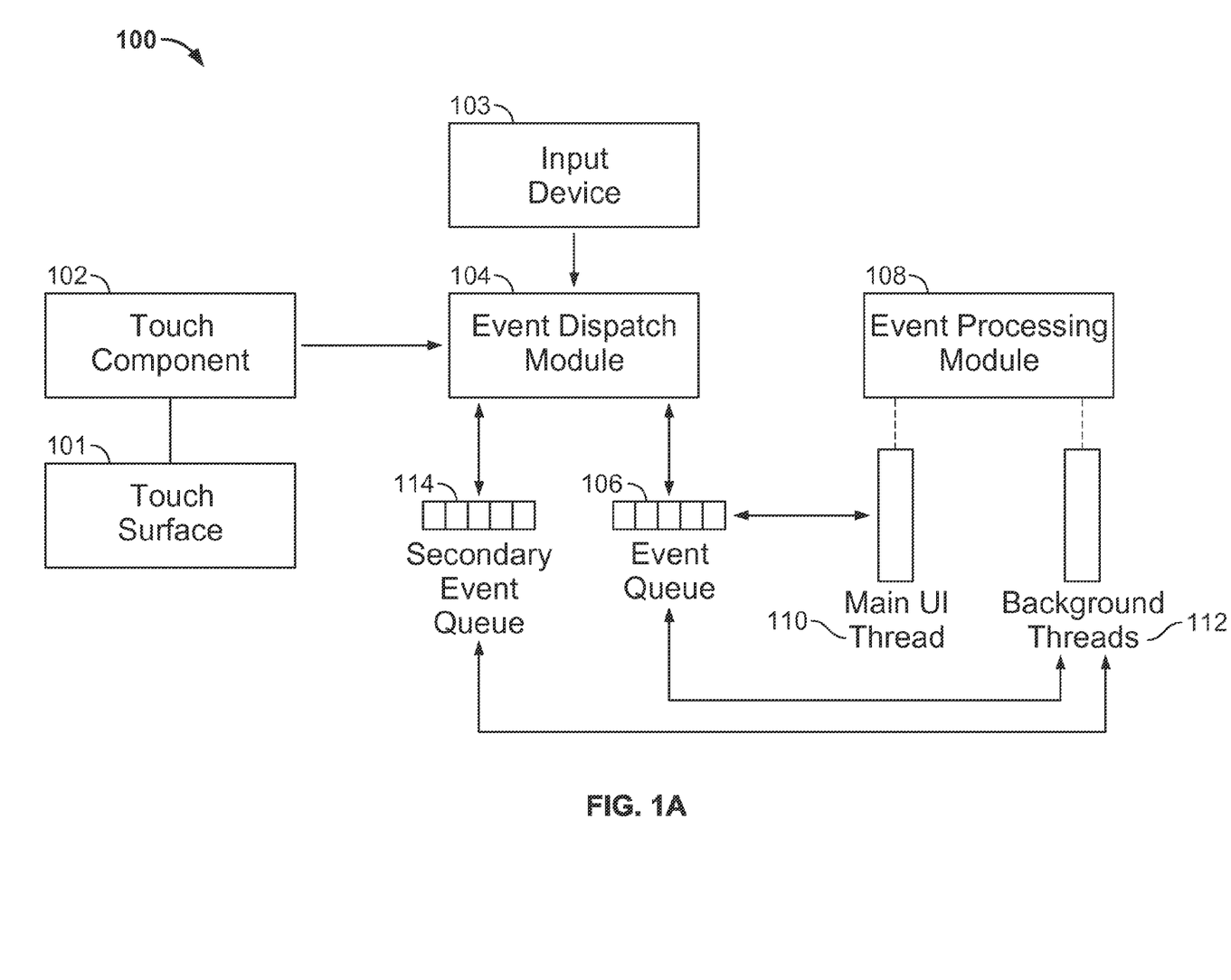
FIGS. 1A and 1B illustrate exemplary architecture for processing events for navigating content in a GUI.
Figure 1B:
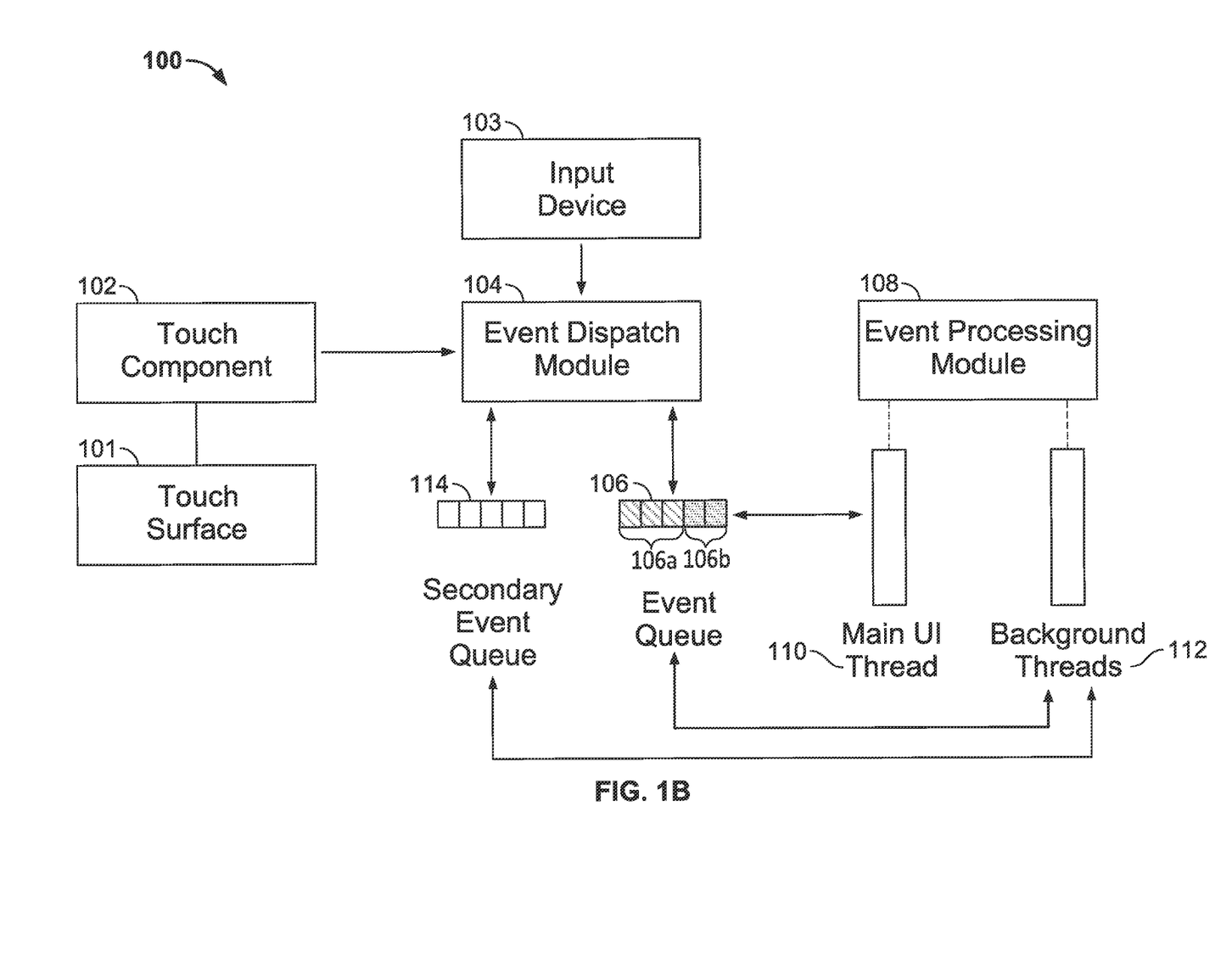

FIGS. 1A and 1B illustrate exemplary architecture 100 for processing events for navigating content in a graphical user interface (GUI). The example device architecture 100 can include a touch component 102, e.g., a touch sensitive or enabled device or touch sensitive surface, an input device 103, e.g., a mouse or track ball, an event dispatch module 104, and an event processing module 108.

The touch component 102 can receive input data generated by touch-sensitive surface 101. Touch component 102 can implement a touch event model that maps the received touch input into input device events. Touch-sensitive surface 101 can process multiple simultaneous points of input, e.g., input device events, including processing data related to the pressure, degree or position of each point of input. Such processing facilitates gestures with multiple fingers, including pinching and swiping. The input device 103, e.g., a mouse, can generate input data, e.g., input device events.

Event dispatch module 104 can receive data describing events from the touch component 102 and the input device 103, and can store the received data describing the input device events in event queue 106. For example, a user interacting with touch-sensitive surface 101 can provide touch input, e.g., a swipe, pinch, and tap, on content displayed on a GUI or other touch surface (e.g., a touch pad) and, in response, event queue 106 can store data describing the input device events in the order they were performed. In addition to storing the received input device events, event queue 106 can store data describing other events relating to the GUI, e.g., messages to be displayed at a particular position on the GUI.

Events stored in event queue 106 can be processed by an event processing module 108 in the order in which they were stored in event queue 106. In some implementations, event processing module 108 can spawn a first thread, such as a main user interface (UI) thread 110 for processing events from event queue 106. Main UI thread 110 can process events stored in event queue 106 in the order in which the events were received by the event dispatch module 104.

In various implementations, event processing module 108 can spawn one or more other threads, such as one or more background threads 112 that can process events from event queue 106. In some implementations, the one or more background threads 112 process events stored in event queue 106 when main UI thread 110 is interrupted, e.g., main UI thread 110 has stalled or has stopped responding while processing events.

In some implementations, one or more background threads 112 process input device events that are stored in event queue 106 when the processing by main UI thread 110 is interrupted. In some other implementations, main UI thread 110 can predict when processing is going to be interrupted and, in response to the prediction, can instruct one or more background threads 112 to process events stored in event queue 106. In some implementations, event dispatch module 104 can store input device events that were received after main UI thread 110 has been interrupted in one or more secondary event queues 114. In such implementations, one or more background threads 112 can process input device events that were stored in one or more secondary event queues 114.

Exemplary Process for Processing Events for Navigating Content

Figure 2:
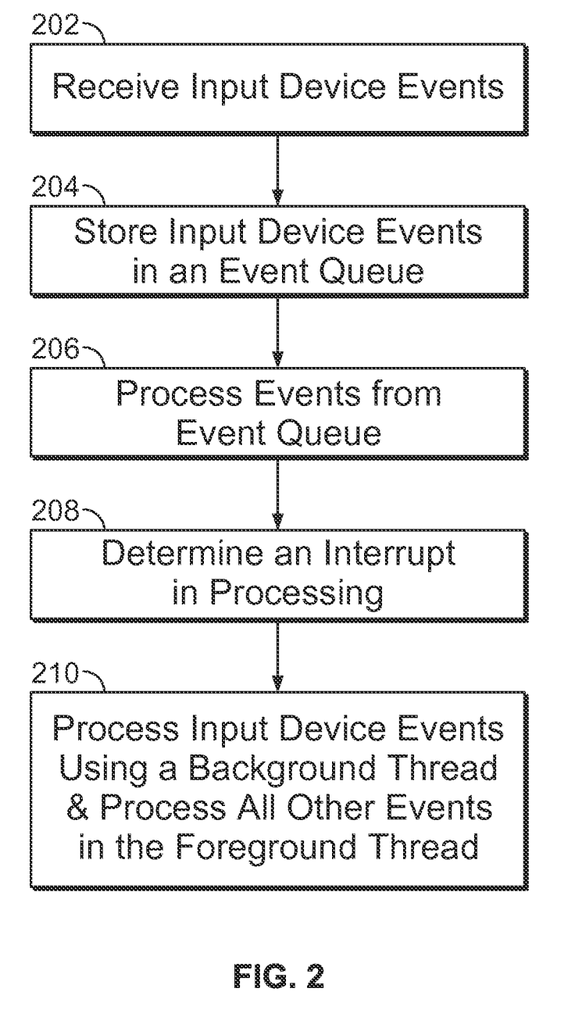
FIG. 2 illustrates an exemplary process for processing events for navigating content in a GUI.

FIG. 2 is a flow diagram of an example process for processing events for navigating content in a GUI. In some implementations, process 200 can be implemented using the architecture described in reference to FIG. 1.

In some implementations, process 200 can begin by receiving data describing input device events, e.g., from touch component 102 or input device 103, as described in reference to FIG. 1 (202). The data can describe the type of input device event, e.g., a touch, gesture, pinch, scroll, or swipe, and how the input device event affects the GUI, e.g., the speed and distance of a scroll. Other types of input device events include a mouse move, e.g., movement of content presented on a UI by clicking one or more buttons on the UI or by dragging the content with the mouse, a mouse scroll wheel event, e.g., scrolling content using a mouse scroll wheel, or a keyboard move, e.g., moving the content using one or more keys on a keyboard.

Process 200 can continue by storing the received data describing the input device events in an event queue, e.g., event queue 106, as described in reference to FIG. 1 (204). As described in FIG. 1, event queue 106 can store other events that generally relate to the GUI, e.g., presentation of content on the GUI, as well as input device events affecting the GUI.

Process 200 can continue by processing data describing events stored in the event queue (206). The data describing events stored in the event queue can be executed, using, e.g., event processing module 108, as described in reference to FIG. 1. Event processing module 108 can use a run loop to monitor event 106 queue to determine when data describing an event has been stored in event queue 106. Upon determining that data describing an event has been stored in event queue 106, event processing module 108 can use one or more threads of execution, e.g., main user interface (UI) thread 110, to execute the data describing the event.

For example, a run loop can be used to monitor event queue 106 to determine when data describing input device events, e.g., a swipe, pinch, scroll, and tap, is received and stored by event queue 106. In response to the determination, event processing module 108 can use, e.g., main UI thread 110 for processing events from the event queue.

Process 200 can continue by determining that an interrupt occurred in the processing of an event (208). For example, the main UI thread can become interrupted, e.g., stalled, while executing an event when the execution is particularly memory and/or processor intensive, or when the execution takes longer than a particular period of time. In some implementations, a main UI thread interrupt, or stall, can be detected by maintaining a time stamp of when the last event was processed by the main UI thread. If a subsequent event in the event queue is not processed with a specified time period, as measured from the time stamp, then the main UI thread is considered stalled.

Process 200 can continue by processing events using one or more background threads (210) (e.g., background threads 112). In some implementations, one or more background threads can execute data describing events from the event queue upon determining that the main UI thread has become interrupted. In some implementations, input device events received after the main UI thread has been interrupted are stored in a second event queue (e.g., a secondary event queue 114) and one or more background threads are used to execute data describing input device events that were stored in the second event queue.

In some implementations, process 200 determines that the main UI thread is no longer interrupted and, in response to the determination, process 200 communicates data to the main UI thread describing the input device events that were processed by the one or more background threads. For example, process 200 can determine that the main UI thread is no longer interrupted when the main UI thread completes its processing of an event. In some implementations, the main UI thread uses the communicated data describing the input device events that were processed by the one or more background threads to update the GUI. For example, the communicated data may indicate that content on the GUI has scrolled to a new position, and the main UI thread can use the communicated data to determine where to display a message on the GUI.

When executing data describing input device events, the one or more background threads may update the GUI, e.g., by drawing content, in response to a input device event. For example, when executing data describing a downward scroll, a background thread may need to update the position of content, e.g., a document or web page, being presented on the GUI by drawing additional content. In some implementations, the background thread draws content that was cached during processing of input device events by the main UI thread. In some implementations, when cached content is unavailable, the background thread draws a placeholder graphic, e.g., a checkerboard. The placeholder graphic can serve as an indicator that a scroll has occurred but that the following content is not yet available for presentation.

In some implementations, the main UI thread can predict when processing is going to be interrupted and, in response to the prediction, can instruct the one or more background threads to process events stored in the event queue. In some implementations, an interrupt can be predicted by having an application that is being processed by the main UI thread communicate information to the application framework indicating that a particularly intensive memory and/or processor operation is about to, or is scheduled to, be performed.

Another Exemplary Process for Processing Events for Navigating Content

Figure 3:
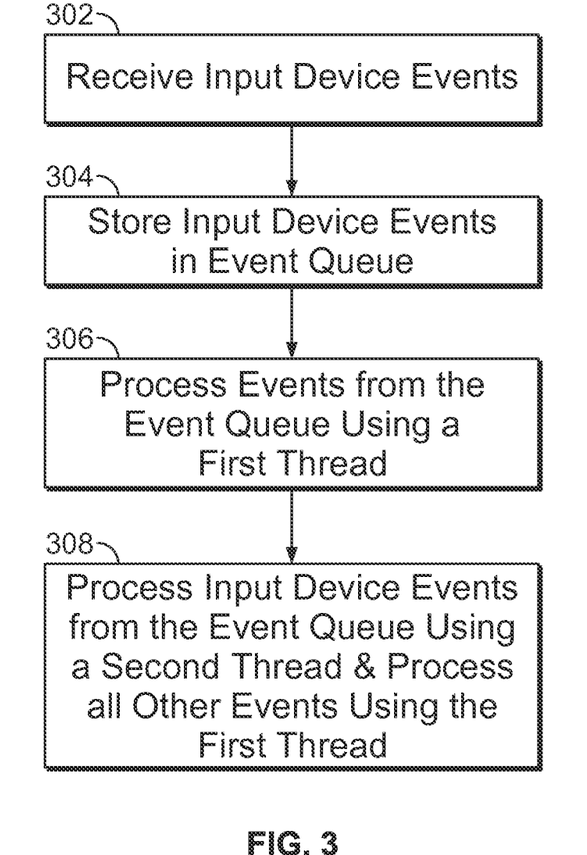
FIG. 3 illustrates another exemplary process for processing events for navigating content in a GUI.

FIG. 3 is a flow diagram of an example process for processing events for navigating content in GUI. In some implementations, process 300 can be implemented using the architecture described in reference to FIG. 1.

In some implementations, process 300 can begin by receiving data describing input device events, e.g., from a touch component 102 or input device 103, as described in reference to FIG. 1 (302).

Process 300 can continue by storing the received data describing the input device events in an event queue, e.g., an event queue 106, as described in reference to FIG. 1 (304). As described in FIG. 1, the event queue can store events that generally relate to the GUI, e.g., presentation of content on the GUI, as well as input device events affecting the GUI. In some implementations, the events describe operations relating to the GUI, e.g., messages to be displayed on the GUI or content to be drawn on the GUI, and the input device events reference a touch, gesture, pinch, swipe, mouse input, or mouse scroll, as described in reference to FIG. 1.

In some implementations, the data describing events is executed by a first thread and data describing input device events is executed by a second thread. Thus, for example, input device events can be processed exclusively by one or more dedicated background threads. In some implementations, the event queue is shared between the first and second threads. In some implementations, the event queue is partitioned so that the input device events are stored in a specified address space. For example, for an event queue of size 100, the address space defined by the first 50 slots can be allocated to data describing events, and the address space defined by the last 50 slots can be allocated to data describing input device events. For example, as shown in FIG. 1B, in the event queue 106, portion 106a may correspond to an address space allocated to data describing events, and portion 106b may correspond to an address spaced allocated to data describing input device events.

Process 300 can continue by processing data describing events stored in the event queue using a first thread (306). For example, the process 300 can use a main user interface (UI) thread for processing data describing events stored in the event queue, as described in reference to FIG. 2.

Process 300 can continue by processing input device events using a second thread (308). For example, one or more background threads can execute data describing input device events stored in the event queue.

In some implementations, input device events received after the main UI thread has been interrupted are stored in a second event queue and one or more background threads are used to execute data describing input device events that were stored in the second event queue.

Exemplary Sequence Diagrams

Figure 4A:
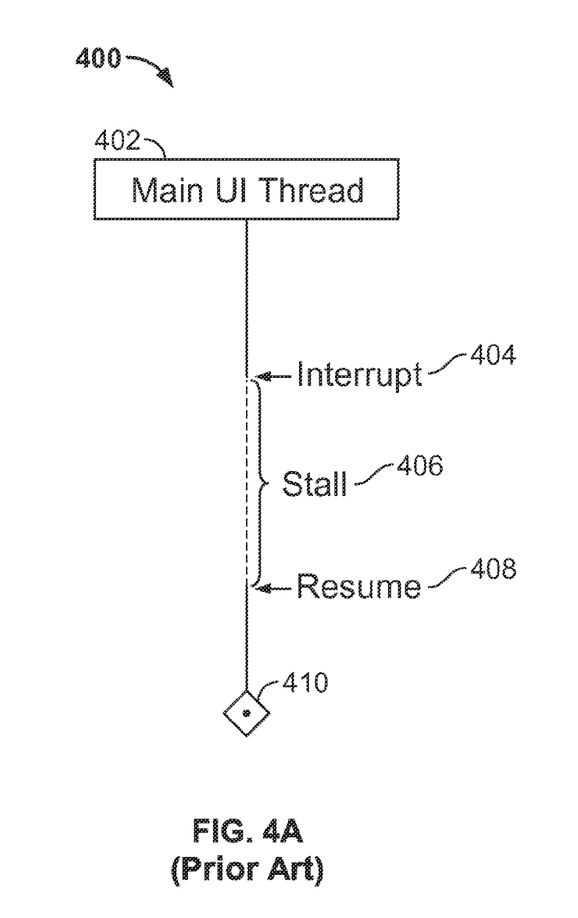
FIGS. 4A-4B are exemplary diagrams illustrating processing of an event relating to a graphical user interface.

FIG. 4A is an exemplary sequence diagram 400 illustrating processing of an event, e.g., a scroll, relating to a graphical user interface (GUI) by a main user interface (UI) thread 402. At 404, the main UI thread is interrupted and, as result, the main UI thread 402 is no longer processing the event relating to the GUI stalled 406 for a period of time 406. At 408, the main UI thread 402 resumes processing of the event relating to the GUI and processes the event until completion 410.

Figure 4B:
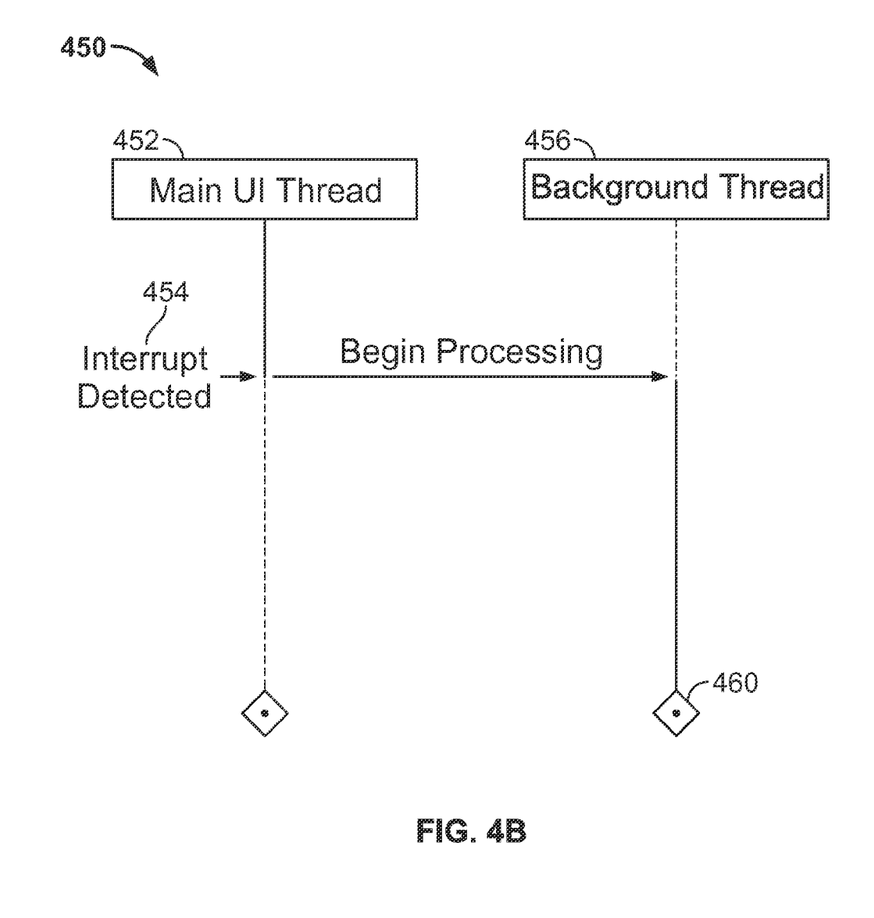

FIG. 4B is an exemplary diagram 450 illustrating processing of an event, e.g., a scroll, relating to a GUI according to an implementation described in this specification. In FIG. 4B, the event is processed by a main user interface thread 452. At 454, a determination is made that the main UI thread 452 is interrupted. In response to the determination, a background thread 456 is spawned and the background thread 456 processes the event until completion 460.

Exemplary Device Architecture

Figure 5:
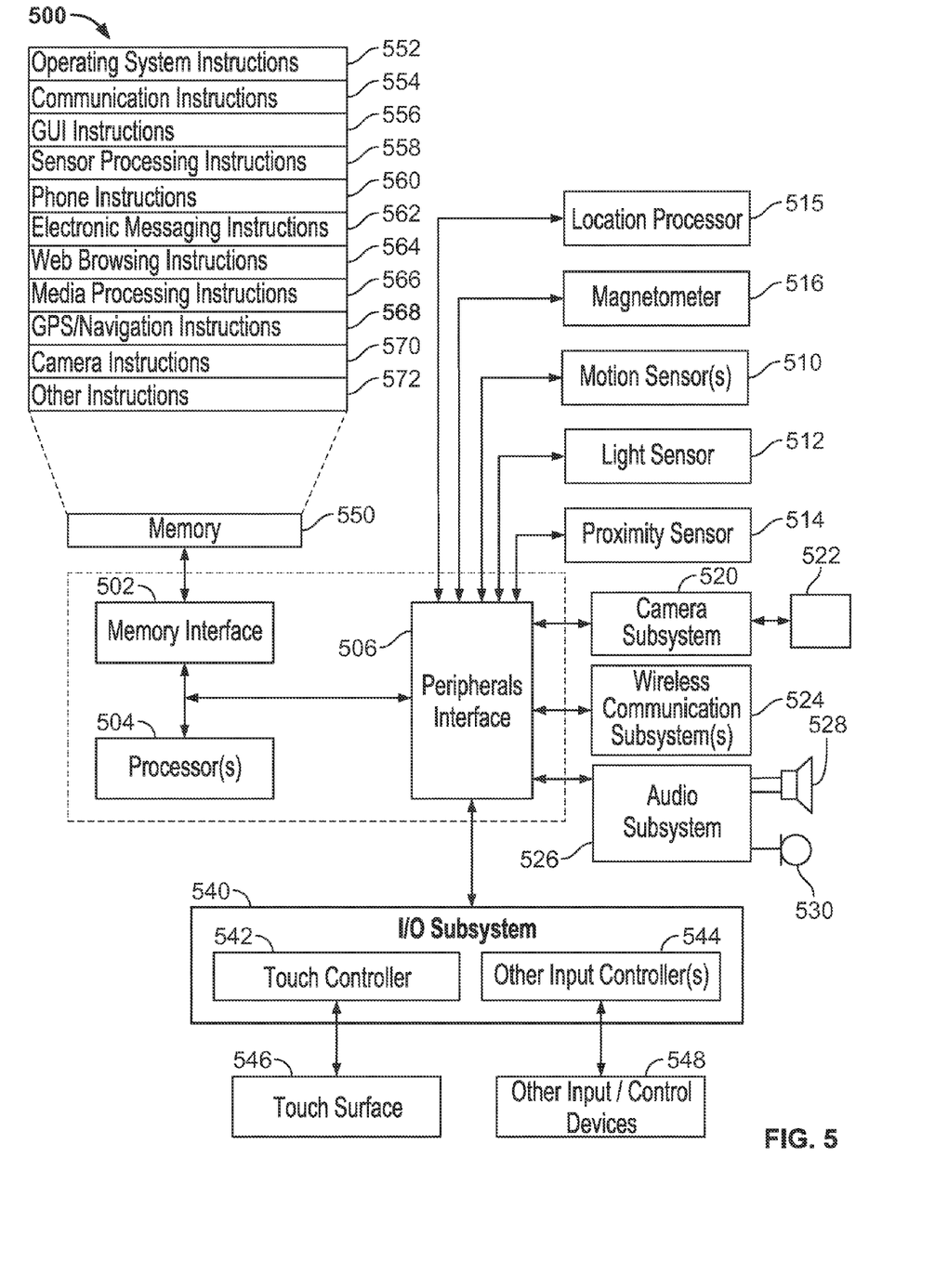
FIG. 5 is a block diagram of an exemplary architecture for a device capable of processing events for navigating content in a GUI.

FIG. 5 is a block diagram of an exemplary architecture for a device capable of input device event processing. Architecture 500 can be implemented in any device for generating the features described in reference to FIGS. 1-4, including but not limited to portable or desktop computers, smart phones and electronic tablets, television systems, game consoles, kiosks and the like. Architecture 500 can include memory interface 502, data processor(s), image processor(s) or central processing unit(s) 504, and peripherals interface 506. Memory interface 502, processor(s) 504 or peripherals interface 506 can be separate components or can be integrated in one or more integrated circuits. The various components can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the device. For example, in some implementations, light sensor 512 can be utilized to facilitate adjusting the brightness of touch surface 546. In some implementations, motion sensor 510 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 506, such as a temperature sensor, a biometric sensor, or other sensing device, to facilitate related functionalities.

Location processor 515 (e.g., GPS receiver) can be connected to peripherals interface 506 to provide geo-positioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 524. Communication subsystem(s) 524 can include one or more wireless communication subsystems. Wireless communication subsystems 524 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 524 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 524 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 526 can be coupled to a speaker 528 and one or more microphones 530 to facilitate voice-enabled functions, such as voice recognition, voice replication, digital recording, and telephony functions.

I/O subsystem 540 can include touch controller 542 and/or other input controller(s) 544. Touch controller 542 can be coupled to a touch surface 546. Touch surface 546 and touch controller 542 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 can display virtual or soft buttons and a virtual keyboard, which can be used as an input/output device by the user.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In some implementations, device 500 can present recorded audio and/or video files, such as MP3, AAC, and MPEG files. In some implementations, device 500 can include the functionality of an MP3 player and may include a pin connector for tethering to other devices. Other input/output and control devices can be used.

Memory interface 502 can be coupled to memory 550. Memory 550 can include high-speed random access memory or non-volatile memory, such as one or more magnetic disk storage devices, one or more optical storage devices, or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers or servers. Communication instructions 554 can also be used to select an operational mode or communication medium for use by the device, based on a geographic location (obtained by the GPS/Navigation instructions 568) of the device. Memory 550 may include graphical user interface instructions 556 to facilitate graphic user interface processing, such as described in reference to FIGS. 1-4; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions and display GUIs; media processing instructions 566 to facilitate media processing-related processes and functions; GPS/Navigation instructions 568 to facilitate GPS and navigation-related processes; and camera instructions 570 to facilitate camera-related processes and functions. The memory 550 may also store other software instructions 572 for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

What is claimed is:

1. A method comprising:

receiving one or more input device events for navigating content presented on a graphical user interface;

storing the one or more input device events in an event queue, the event queue including one or more GUI events relating to the graphical user interface (GUI), wherein the input device events and the GUI events are of different types, and wherein the GUI events are stored in a first portion of the event queue while the input device events are stored in a second portion of the event queue that is distinct from the first portion;

processing the one or more GUI events stored in the event queue using a first processing thread and processing the one or more input device events from the event queue using a second processing thread;

determining a stall in the processing by the first processing thread;

storing input device events received after determining the stall in the processing by the first processing thread in a second event queue; and processing the input device events from the second event queue using the second processing thread, wherein the method is performed by one or more hardware processors.

2. The method of claim 1, wherein the one or more input device events are generated in response to input generated by a finger touching a touch sensitive device.

3. The method of claim 2, wherein the one or more input device events include one or more of a touch, gesture, pinch, swipe, or finger move.

4. The method of claim 1, wherein the one or more input device events are generated in response to input generated by an input device.

5. The method of claim 4, wherein the one or more input device events include one or more of a mouse move, a mouse scroll wheel move, or a keyboard move.

6. The method of claim 1, wherein the one or more input device events are stored in the event queue in a specified address space.

7. The method of claim 1, wherein the input device event is a scroll input, and, in response to the scroll input, the second processing thread draws content on the graphical user interface.

8. The method of claim 7, wherein the drawn content is content that was cached during processing of input device events in the one or more input device events by the first processing thread.

9. The method of claim 7, wherein the drawn content is a placeholder graphic.

10. The method of claim 1, further comprising:

determining that the first processing thread is no longer stalled; and in response to the determination, communicating data to the first processing thread, the data describing input device events that were processed by the second processing thread.

11. The method of claim 10, wherein the first processing thread updates the graphical user interface based on the data describing input device events that were processed by the second processing thread.

12. The method of claim 1, wherein the one or more GUI events or the one or more input device events are initially processed by the first processing thread, and wherein processing the one or more input device events from the event queue using a second processing thread comprises:

in response to determining the stall in the processing by the first processing thread, spawning the second processing thread for processing the one or more input device events from the event queue.

13. The method of claim 1, wherein the one or more GUI events or the one or more input device events are initially processed by the first processing thread, and wherein processing the one or more input device events from the event queue using a second processing thread comprises:

predicting, by the first processing thread, an occurrence of the stall in the processing by the first processing thread; and in response to the prediction, sending an instruction by the first processing thread to the second processing thread to process the one or more input device events from the event queue.

14. The method of claim 13, wherein predicting the occurrence of the stall in the processing of the one or more GUI events by the first processing thread comprises:

communicating, using an application associated with events processed by the first processing thread and to an application framework, information about an upcoming occurrence of an intensive processing operation for the first processing thread.

15. A non-transitory computer storage medium encoded with instructions that when executed by one or more computers cause the one or more computers to perform operations comprising:

receiving one or more input device events for navigating content presented on a graphical user interface;

storing the one or more input device events in an event queue, the event queue including one or more GUI events relating to the graphical user interface (GUI), wherein the input device events and the GUI events are of different types, and wherein the GUI events are stored in a first portion of the event queue while the input device events are stored in a second portion of the event queue that is distinct from the first portion;

processing the one or more GUI events stored in the event queue using a first processing thread and processing the one or more input device events from the event queue using a second processing thread;

determining a stall in the processing by the first processing thread;

storing input device events received after determining the stall in the processing by the first processing thread in a second event queue; and processing the input device events from the second event queue using the second processing thread.

16. The non-transitory computer storage medium of claim 15, wherein the one or more input device events are stored in the event queue in a specified address space.

17. The non-transitory computer storage medium of claim 15, wherein the one or more input device events are generated in response to one of: an input generated by a finger touching a touch sensitive device, or input generated by an input device.

18. The non-transitory computer storage medium of claim 15, wherein the input device event is a scroll input, and, in response to the scroll input, the second processing thread draws content on the graphical user interface.

19. The non-transitory computer storage medium of claim 17, wherein the one or more input device events include one or more of a touch, gesture, pinch, swipe, finger move, a mouse move, a mouse scroll wheel move, or a keyboard move.

20. A non-transitory computer storage medium encoded with instructions that when executed by one or more computers cause the one or more computers to perform operations comprising:

receiving one or more input device events for navigating content presented on a graphical user interface;

storing the one or more input device events in an event queue, the event queue including one or more GUI events relating to the graphical user interface (GUI), wherein the input device events and the GUI events are of different types, and wherein the GUI events are stored in a first portion of the event queue while the input device events are stored in a second portion of the event queue that is distinct from the first portion;

processing the one or more input device events and the one or more GUI events from the event queue using a first processing thread;

determining a stall in the processing of the one or more input device events and the one or more GUI events by the first processing thread;
in response to determining the stall:
    storing input device events received after the stall in a second event queue; and
    spawning a second processing thread, wherein the second processing thread processes the one or more input device events from the second event queue.

21. A system comprising:
one or more computers and one or more storage devices storing instructions that are operable, when executed by the one or more computers, to cause the one or more computers to perform operations comprising:
receiving one or more input device events for navigating content presented on a graphical user interface;
storing the one or more input device events in an event queue, the event queue including one or more GUI events relating to the graphical user interface (GUI), wherein the input device events and the GUI events are of different types, and wherein the GUI events are stored in a first portion of the event queue while the input device events are stored in a second portion of the event queue that is distinct from the first portion;
processing the one or more input device events and the one or more GUI events stored in the event queue using a first processing thread;
determining that a stall has occurred in the processing of the one or more input device events and the one or more GUI events by the first processing thread;
in response to determining the stall:
    storing input device events received after the stall in a second event queue; and
    spawning a second processing thread, wherein the second processing thread processes the one or more input device events from the second event queue.

22. A system comprising:
one or more computers and one or more storage devices storing instructions that are operable, when executed by the one or more computers, to cause the one or more computers to perform operations comprising:
receiving one or more input device events for navigating content presented on a graphical user interface;
storing the one or more input device events in an event queue, the event queue including one or more GUI events relating to the graphical user interface (GUI), wherein the input device events and the GUI events are of different types, and wherein the GUI events are stored in a first portion of the event queue while the input device events are stored in a second portion of the event queue that is distinct from the first portion;
processing the one or more GUI events stored in the event queue using a first processing thread and processing the one or more input device events from the event queue using a second processing thread;
determining a stall in the processing by the first processing thread;
storing input device events received after determining the stall in the processing by the first processing thread in a second event queue; and
processing the input device events from the second event queue using the second processing thread.

23. The system of claim 22, wherein the one or more input device events are generated in response to one of: an input generated by a finger touching a touch sensitive device, or input generated by an input device.

24. The system of claim 23, wherein the one or more input device events include one or more of a touch, gesture, pinch, swipe, finger move, a mouse move, a mouse scroll wheel move, or a keyboard move.

25. The system of claim 22, wherein the input device event is a scroll input, and, in response to the scroll input, the second processing thread draws content on the graphical user interface.

* * * * *